March 29, 1966

P. GUERIN DE MONTGAREUIL ETAL 3,242,645

PROCESS FOR SEPARATING A BINARY GAS MIXTURE
BY CONTACT WITH AN ADSORBENT

Filed Dec. 11, 1962

INVENTORS
PIERRE GUERIN DE MONTGAREUIL
DANIEL DOMINE

By Irwin J. Thompson
ATTY.

P. GUERIN DE MONTGAREUIL ETAL  3,242,645
PROCESS FOR SEPARATING A BINARY GAS MIXTURE
BY CONTACT WITH AN ADSORBENT

Filed Dec. 11, 1962    7 Sheets-Sheet 7

INVENTORS
PIERRE GUERIN DE MONTGAREUIL
DANIEL DOMINE

By Irwin S. Thompson
ATTY

United States Patent Office 3,242,645
Patented Mar. 29, 1966

3,242,645
PROCESS FOR SEPARATING A BINARY GAS MIXTURE BY CONTACT WITH AN ADSORBENT
Pierre Guerin de Montgareuil, Uriage, and Daniel Dominé, Meudon, France, assignors to l'Air Liquide, Societe Anonyme pour l'Etude et l'Exploitation des Procedes Georges Claude
Filed Dec. 11, 1962, Ser. No. 243,884
Claims priority, application France, Dec. 14, 1961, 881,978, Patent 1,317,918
3 Claims. (Cl. 55—58)

The present invention concerns a process for the separation of a binary gas mixture by means of an adsorbent capable of adsorbing, at a given temperature, the two component gases at high, but unequal speeds, and capable of being degassed substantially at the same temperature merely by the action of a vacuum.

It has already been proposed in French Patent No. 1,223,261 of November 21, 1957, to effect the separation of a binary gas mixture by means of an adsorbent capable of adsorbing, at a given temperature comparable, but different quantities of the two component gases, but at a sufficiently high speed, at least in the case of the more adsorbable gas, in relation to the speed of flow of the gas mixture through the adsorbent mass, and capable of being degassed substantially at the same temperature merely by the action of a vacuum, consisting in admitting into a chamber containing the adsorbent which has been degassed in vacuo, through a first zone of the said chamber, a given quantity of mixture under pressure at the temperature under consideration, in withdrawing from the chamber shortly after the end of the admission of the mixture, through a second zone remote from the first, a first gas fraction, thus lowering the pressure of the chamber to an intermediate value, and in extracting from the chamber, merely under the action of a vacuum, and at a temperature close to the admission temperature, a residual gas fraction, all of which operations may be periodically repeated, and by introducing a further quantity of the mixture into the chamber at each period, after extraction of the residual gas fraction of the preceding period by means of a vacuum. This process is based upon the establishment, through a column of adsorbent, of successive equilibria between the adsorbed gas and the unadsorbed gas, in which the concentrations of the less adsorbable gas, both in the unadsorbed phase and in the adsorbed phase, increase continuously from the admission end to the withdrawal end. It is more particularly possible thereby to obtain economically from the air, with the aid of natural or synthetic zeolites, a fraction having an oxygen content of 90–95%, with an oxygen extraction percentage of about 75%, the subsisting impurity being mainly argon.

However, it is not possible by the aforesaid process to effect the separation of binary gas mixtures in which the two components become adsorbed under equilibrium conditions in substantially equal quantities. This is the case more especially with oxygen and argon in the presence of the known natural or synthetic zeolites. In the process of the aforesaid French Patent No. 1,223,261 the argon behaves substantially in the same way as the oxygen and therefore remains mixed with the latter gas, of which it reduces the purity.

It has also been proposed to separate a binary gas mixture by making use of the difference of the speeds of adsorption of its two constituents, in U.S. Patent 2,944,-627, which describes more especially the separation of air by passing it over synthetic zeolites, such as that known as "Molecular Screen 4A," the more quickly adsorbable constituent being the oxygen. However, the process according to the said patent comprises, after extraction of the fraction enriched with the less quickly adsorbable constituent at the end at which the gas to be separated is introduced, an extraction of a fraction enriched with the more quickly adsorbable constituent as a result of a reflux of the gas in the opposite direction through the adsorbable mass resulting from an expansion at the inlet end and optionally of a flushing in the opposite direction by means of a portion of the fraction enriched in the less quickly adsorable constituent. It therefore necessitates the maintenance of a relatively considerable pressure drop at that end of the adsorbent which is opposite to the end at which the mixture to be separated is introduced, and consequently a relatively high expenditure of compression energy. Moreover, it is not possible therewith to obtain the more quickly adsorbable gas as in a high concentration, because it remains diluted by the less quickly adsorbable gas emanating from the reflux, the adsorbent never being degassed.

The process of the invention has for its object to obviate the aforesaid disadvantages and to render possible with relatively low expenditure of energy, the separation of binary gas mixtures of which the two constituents become adsorbed at equilibrium in substantially equal quantities, and of those which become unequally adsorbed at equilibrium. More especially, it makes it possible to effect at ambient temperature, or in the neighborhood thereof, the separation of air and of mixtures of oxygen and argon, more especially mixtures rich in oxygen which result from the separation of air by the process of French Patent No. 1,223,261.

This process is characterised by the following successive operations:

(a) Into a chamber filled with adsorbent previously degassed in vacuo, and adapted to communicate through a first zone with a receiving chamber, at least as soon as the pressure in the said first zone exceeds a predetermined value, there is introduced through a second zone remote from the first a given quantity of gas mixture, under a pressure such that its speed of flow through the adsorbent is sufficienly high to prevent adsorption equilibrium from being established between the adsorbed gas and the unadsorbed gas, but relatively low as compared with the speed of adsorption of the more rapidly adsorbed component, until the pressure has become equalised from the introduction zone of the adsorbent-filled chamber to the receiving chamber.

(b) The introduction of the gas mixtures immediately interrupted, and the adsorbent-filled chamber is isolated from the receiving chamber.

(c) The fractions present in the receiving chamber and in the adsorbent-filled chamber are separately withdrawn by subjecting at least the latter to the action of a vacuum.

All of these operations may be periodically repeated by introducing a further quantity of gas mixture into the adsorbent-filled chamber at each period. The above-defined process has in common with that of Patent No. 1,223,261 its isothermal character, in the sense that the desorption of the adsorbed fraction is effected simply by means of a vacuum, without any temperature increase, and the fact that it is carried out under a constantly variable pressure. It also makes use of a "column" effect, the speed of flow of the gas mixture through the adsorbent mass being so fixed that the mixture becomes gradually enriched with the less rapidly adsorbable constituent in proportion as it encounters further layers of adsorbent. On the other hand, the enrichment is not obtained as a result of the higher adsorption capacity at equilibrium of the adsorbent for one of the constituents of the gas mixture, but as a result of the higher rate of adsorption of one of them. The process of the invention may even be employed to enrich the unadsorbed fraction in the component gas which is the more adsorbable at equilibrium, provided that the rate of adsorption of the latter is substantially lower than that of the less adsorbable component gas.

Further features and advantages of the invention will become apparent from the following detailed description of methods of carrying out the invention, with reference to the accompanying drawings, in which.

Figure 1:
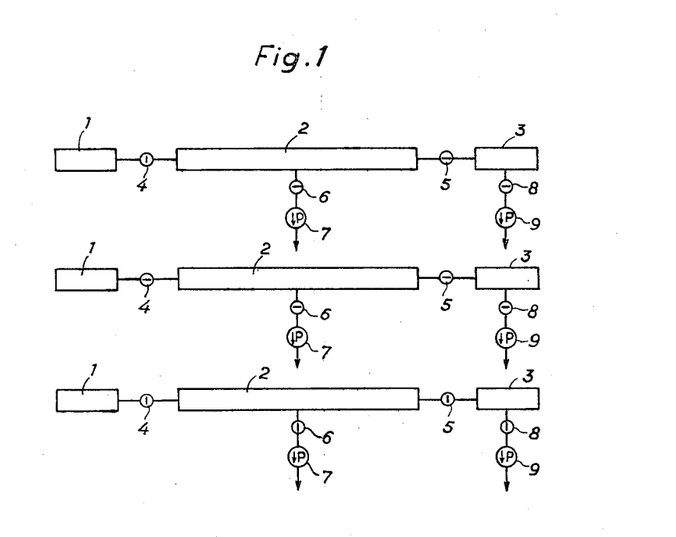
FIGURE 1 illustrates the successive operations to be performed for the separation of a gas mixture in accordance with the invention.

Referring now to FIGURE 1, there are hereinafter described the three fundamental steps of the process of the invention. Three cavities 1, 2 and 3 are disposed in series, and can be placed in communication by means of the valves 4 and 5. The cavity 1 is a receptacle filled with the gas mixture to be separated under a superatmospheric pressure. Alternatively, it may be a pipe for the distribution of gas under constant pressure. The cavity 2 is a column filled with an adsorbent previously degassed in vacuo by being placed in communication with the vacuum pump 7 through the valve 6. The cavity 3 is a receptacle which has previously been exhausted by the vacuum pump 9 through the valve 8.

The valves 4, 6 and 8 are initially closed, and the valve 5 open. The fractionating operation is as follows:

The valve 4 is opened. The gas mixture emanating from the cavity 1 passes through the adsorbent mass and enters the cavity 3, until the pressures have become equal in all the three cavities 1, 2 and 3. The time necessary for equalising the pressures depends upon the initial pressure and the length of the cavity, but it is relatively short. For example, it is only a few seconds for the separation of a mixture of oxygen and argon on a column 1.50 m. long, filled with synthetic zeolite Molecular Screen 4A.

The cavities 1, 2 and 3 are thereafter isolated by closing the valves 4 and 5. The vacuum pumps 7 and 9 are then started and the valves 6 and 8 opened. The initial mixture has been divided into two fractions, one enriched in the less rapidly adsorbable gas, extracted by the vacuum pump 9, and the other enriched in the more rapidly adsorbable gas, extracted by the vacuum pump 7.

In this arrangement, the cavity 3 and its vacuum pump 9 may be replaced by a receptacle of the gasometer type, such as a plastic bladder of zero initial volume, which becomes filled immediately the pressure at its inlet reaches atmospheric pressure, or even an arbitrarily chosen pressure, below the pressure of introduction.

The aforesaid process is applicable more especially to the separation of mixture of oxygen and argon by passing them through a mass of zeolite having an effective pore diameter in the neighbourhood of 4 A., more especially of the synthetic zeolite sold under the trade name Molecular Screen 4A. Other natural or synthetic zeolites, such as chabazite and mordenite, optionally modified by ion exchange, so as to obtain an effective pore diameter of 4 angstroms, are also suitable for carrying out this process. The coefficients of adsorption at equilibrium of oxygen and argon on the Molecular Screen 4A in granule form, at 20° C., under 760 mm. Hg, are the following (in cubic centimeters, under normal conditions, per gramme of adsorbent):

|  | Cc./g. |
|---|---|
| Oxygen | 2.6 |
| Argon | 2.2 | which would indicate a very small argon enrichment, of no practical interest, of the unadsorbed gas.

Figure 2:
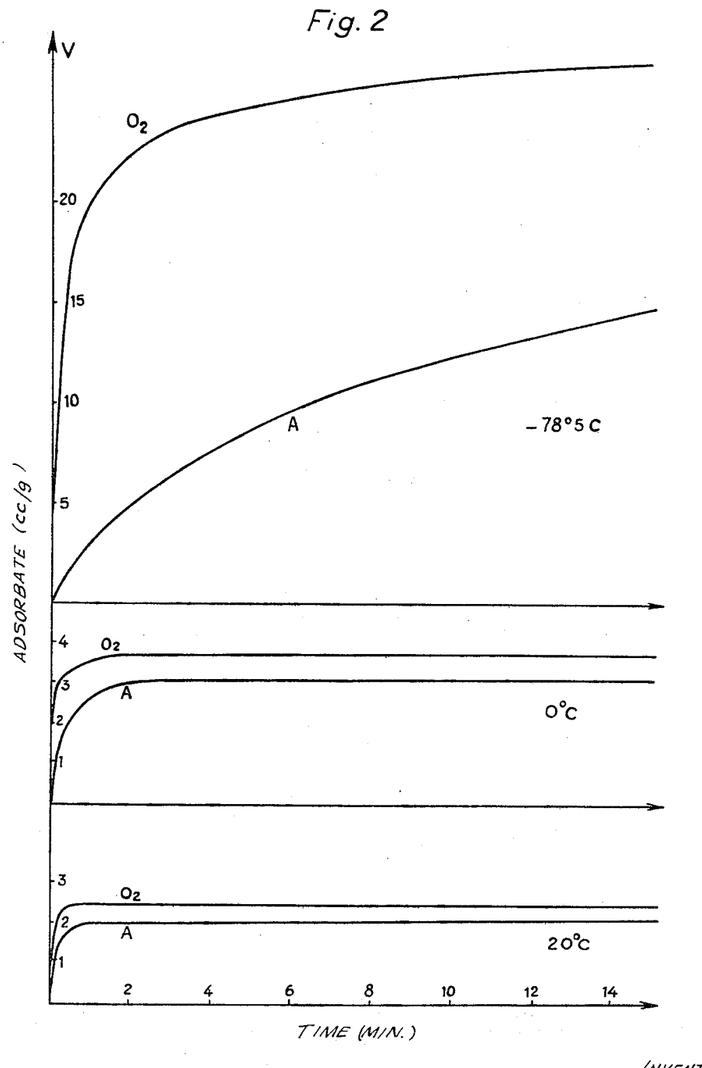
FIGURE 2 illustrates the change of the quantities of oxygen and argon adsorbed as a function of time on a synthetic zeolite sold by Union Carbide Corporation under the trade name "Molecular Screen 4A," at three different temperatures.

On the other hand, the speeds of adsorption of these two gases on the Molecular Screen 4A at and above ambient temperature are different, as is shown by the curves of FIGURE 2, which give the quantity of each of these gases (in cc./g.) adsorbed under atmospheric pressure as a function of time. The oxygen is adsorbed more rapidly.

The following Table I gives, for various temperatures, the percentages of oxygen and argon adsorbed after 30 seconds, as compared with the quantity adsorbed at equilibrium, on the Molecular Screen 4A.

TABLE I

| Temperature | Oxygen | Argon |
|---|---|---|
| 20° C | 97.5 | 80 |
| 0° C | 89 | 60 |
| −78.5° C | 66 | 9 |

The difference between the rates of adsorption of oxygen and argon therefore increases as the temperature decreases.

The examples of separation given in the following relate to mixtures of oxygen and argon having a high oxygen content, obtained, for example, as products of the separation of air by the process of French Patent No. 1,223,261.

Figure 3:
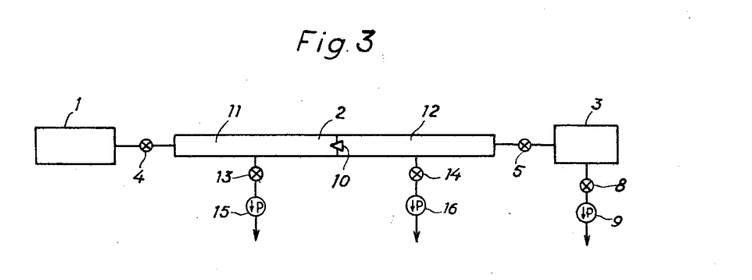
FIGURE 3 illustrates a separating apparatus according to the invention, wherein the cavity containing adsorbent is divided into two different compartments, which shows the enrichment by "column" effect.

The apparatus employed is that of FIGURE 3. The cavity 2 is a cylindrical receptacle having a diameter of 50 mm. and a length of 1.50 m., which contains 2 kg.

of zeolite Molecular Screen 4A in the form of granules of 1.6 mm. This column may be divided into two compartments 11 and 12 by a non-return valve 10 situated at its mid-point. After an operation, the gas in each of the compartment may be extracted by a vacuum pump 15 or 16 in order to measure its volume and to analyse it. The volume of the cavity may be varied by any appropriate means, whereby it is possible to vary the volume of the argon-enriched gas phase leaving the column 2, and consequently the proportion of withdrawal S=extracted volume of gas/volume of gas treated. On the other hand, the argon enrichment is defined by the gain G=argon content of the extracted gas/argon content of the initial gas, and the yield by the proportion of extraction E=quantity of argon extracted/initial quantity of argon. The efficiency of the separation is therefore defined by the curve repesenting the variation of the gain G as a function of the proportion of extraction E.

In the following, the influence on this separating efficiency of a number of variables, pressure of the gas, loss of pressure, gas charge of the adsorbent, length of the column of adsorbent and argon content of the initial mixture, is indicated.

The influence of the initial pressure of the gas was determined by treating quantities by weight of gas of like order, but contained in receptacles of differing capacities. The results are summarised in the following Table II.

TABLE II

| Capacity of 1 (in litres) | Effective inlet pressure (kg./cm.²) | Volume treated (at 760 mm. Hg) (in litres) | Initial argon content, percent by vol. | Extraction proportion percent E | Gain G | Final pressure |
|---|---|---|---|---|---|---|
| 6.7 | 1.25 | 7.71 | 5.5 | 49.7 | 2.26 | Atm. pressure. |
| 6.7 | 2 | 10.2 | 5.5 | 48 | 2.2 | 370 g./cm.² |
| 1 | 8 | 8 | 5.5 | 50 | 1.8 | Atm. pressure. |

A longer period of passage, coupled with the use of a lower inlet pressure, leads to higher efficiency.

The influence of the pressure losses was studied by varying, with the same inlet pressure, the throughflow diameter of the valve 5 (FIGURE 3). The results are summerised in the following Table III.

TABLE III

| Effective inlet pressure, kg./cm.² | Volume treated (l.) | Loss of pressure | Extraction proportion | Gain |
|---|---|---|---|---|
| 1.25 | 7.7 | Head of 12 mm | 49.7 | 2.26 |
| 1.25 | 6.8 | Head of 2 mm | 36.4 | 3.2 |

The gain is appreciably improved at the cost of some reduction in the extraction proportion. An increased loss of pressure, which increases the duration of the passage, increases the efficiency of the separation, at least within the limits of the tests performed.

Figure 4:
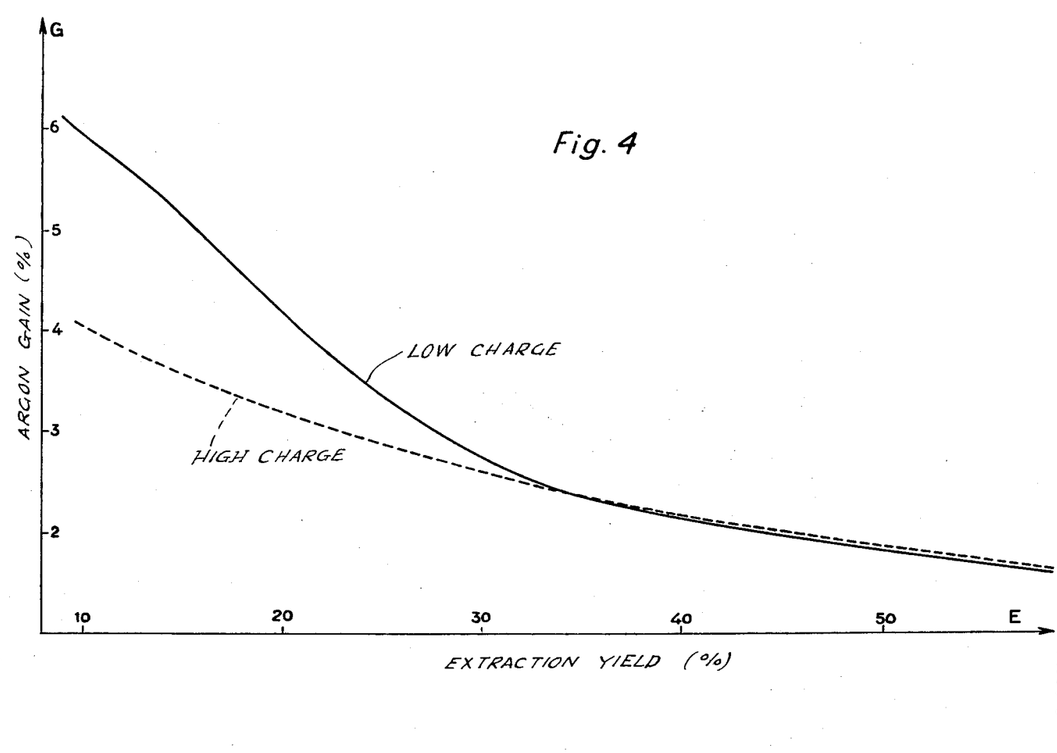
FIGURE 4 illustrates the influence of the gas charge of the adsorbent on the enrichment and the proportion of extraction in the separation of a mixture of oxygen and argon containing 5.3% by volume of argon on the synthetic zeolite Molecular Screen 4A.

The influence of the gas charge of the adsorbent is illustrated in FIGURE 4, in which the solid-lined curve represents the variation of the gain as a function of the extraction proportion for a separated volume of about 8 litres (capacity 1 of 1 litre, effective initial pressure 8 kg./cm.²) and effective final pressure between 300 and 400 g./cm.². The chain-lined curve corresponds to a quantity of 18 to 20 l. (capacity 1 of 6.7 l., effective initial pressure 5 kg./cm.²) and effective final pressure of 1.5 to 2 kg./cm.². The efficiency of the separation is slightly lower for a higher charge, at least in the range of relatively high gains.

The influence of the length of the column is shown by collecting and analysing separately the gases remaining in the two compartments of the column.

The following Table IV shows the argon contents of the gases of the two compartments 11 and 12 and of the cavity 3 (FIGURE 3) with a capacity 1 of 1 litre and an initial effective gas pressure of 8 kg./cm.² and an initial argon content in the gas of 5.3%.

TABLE IV

| Volume of the capacity 3 | Compartment | Argon content (percent by vol.) | Proportion of extraction | Gain |
|---|---|---|---|---|
| 670 cc | 11 | 3.5 | 29.8 | 2.7 |
| | 12 | 4.7 | | |
| | 3 | 14.5 | | |
| 390 cc | 11 | 3.2 | 24.0 | 3.4 |
| | 12 | 5.1 | | |
| | 3 | 18.6 | | |
| 86 cc | 11 | 3.4 | 14.4 | 5.2 |
| | 12 | 5.7 | | |
| | 3 | 27.9 | | |

It will be seen that the argon content of the second compartment 12 is higher than that of the first compartment 11.

This shows the "column" effect, that is to say, the progressive increase of the argon content of the gas phase in proportion as it encounters further beds of adsorbent.

It is also possible, for example by varying the position of the non-return valve separting the two compartments, to obtain in the second compartment a gas fraction having an argon content equal to or in the neighbourhood of that of the initial mixture. After extraction, this gas fraction may be re-injected into the separating apparatus. It is thus possible substantially to reduce the number of separating stages for a given enrichment and a given extraction proportion.

Figure 5:
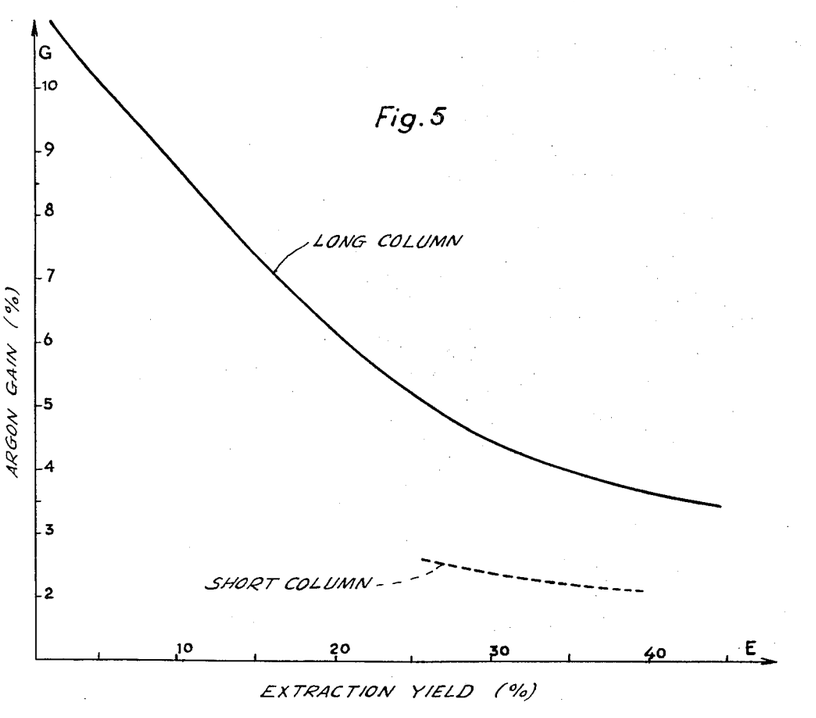
FIGURE 5 illustrates the influence of the length of the column of adsorbent on the enrichment and the proportion of extraction, in the separation of a mixture of oxygen and argon containing 5.7% of argon on the synthetic zeolite Molecular Screen 4A.

The enrichment obtained at the outlet from the column of adsorbent therefore depends upon its length for a constant mass of adsorbent. This is clearly apparent from FIGURE 5, which illustrates the gain and the extraction proportion obtained with the same quantity of synthetic zeolite Molecular Screen 4A (2 kg.) and an effective initial pressure of 1.25 kg./cm.² on an initial mixture containing 5.7% of argon, on the one hand with a column 2.64 m. in length and 37 mm. in diameter (solid-lined curve), and on the other hand with a column 1.50 m. long and 50 mm. in diameter (chain-lined curve). It will be seen that the efficiency of the separation is appreciably increased with the longer column. However, there naturally exists an optimum length, above which the separation becomes less efficient.

Figure 6:
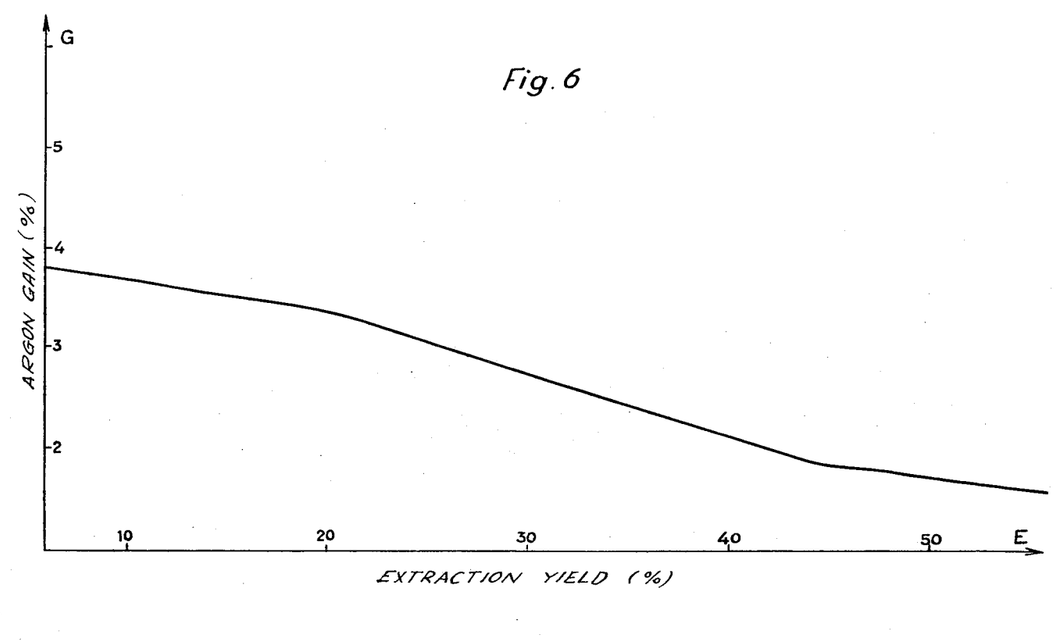
FIGURE 6 illustrates the variation of the enrichment as a function of the proportion of extraction in the separation of oxygen and argon containing 10.55% of argon on the same zeolite.

FIGURE 6 illustrates the variation of the gain as a function of the extraction proportion in the separation of a mixture of oxygen and argon containing 10.55% by volume of argon, initially contained in a cavity 1 of 1 litre under an effective pressure of 8 kg./cm.², on a column 1.50 m. long containing 2 kg. of synthetic zeolite Molecular Screen 4A. An appreciable enrichment is obtained, as in the case of the separation of mixtures containing a lower percentage of argon.

As has already been stated, the process of the invention is also applicable to the fractionation of air, notably with a view to obtaining oxygen-enriched air, by passing the air to be separated over a column of zeolite having an effective pore diameter in the neighbourhood of 4 A., and more especially of Molecular Screen 4A.

It is known that at equilibrium nitrogen is adsorbed in a larger quantity than oxygen on the Molecular Screen 4A. In fact, 7.2 cc. of nitrogen (under normal conditions) is adsorbed at 20° C. and under 760 mm. Hg per gramme of granulated zeolite, against 2.6 cc. of oxygen. On the other hand, at ambient temperature and at temperature sufficiently close thereto for the adsorption isotherms to remain substantially straight—which corresponds to the possibility of ready regeneration of the adsorbent simply by the application of a vacuum—oxygen becomes more rapidly adsorbed than nitrogen, so that after the first few seconds of contact the gas phase is enriched in nitrogen, and the adsorbed phase in oxygen. In the case of the separation of air, the greater part of the argon remains in the nitrogen-enriched fraction.

The experiments of which the results are given in the following were carried out with the aid of a separating apparatus similar to that of FIGURE 1, with a column having a length of 1.32 m. and a diameter of 37 mm., filled with 1 kg. of synthetic zeolite Molecular Screen 4A, and a receiving cavity 3 consisting of an initially empty rubber bladder. However, it should be noted that the presence of a receiving cavity 3 is not necessary if it is desired to obtain only oxygen-enriched air. The nitrogen-enriched fraction leaving the column 2 may be simply discharged into the atmosphere by a non-return valve replacing the valve 5.

The separation tests were applied to a mixture of oxygen and nitrogen containing 21% by volume of oxygen under an initial effective pressure of 2 kg./cm.$^2$. The volume of mixture treated was varied by modifying the time for which the inlet valve 4 (FIGURE 1) was open. The results of the separations are summarised in Table V and in FIGURE 7 of the drawings, which illustrate the variations, on the one hand, of the oxygen concentration X (in percentage) of the fraction obtained by degassing of the adsorbent, and on the other hand of the extraction proportion E of the oxygen in this fraction (fraction of the initial oxygen contained in the volume of air treated, in percentage), as a function of the volume of air V introduced into the column of adsorbent.

duce a sufficiently rapid circulation of the gas through the column. Table VI below shows that with the same inlet valve it is possible to obtain very similar results with initial effective pressures of 2 kg./cm.$^2$ and 1 kg./cm.$^2$ by modifying the period of introduction in order to obtain comparable treated volumes.

TABLE VI

| Initial effective pressure, kg./cm.$^2$ | Period of introduction (in sec.) | Volume of mixture treated, cc. (20° C., 760 mm.) | Gas extracted from the cavity 2 | | | Gas collected at 3 | | |
|---|---|---|---|---|---|---|---|---|
| | | | Volume | Concentration O$_2$, percent | Extraction per centage | Volume | Concentration | Extraction proportion, percent |
| 1 | 4 | 5,400 | 2,800 | 28 | 67.8 | 2,600 | 14.4 | 32.2 |
| 2 | 2.5 | 5,280 | 2,780 | 27.3 | 69.7 | 2,500 | 13.2 | 30.3 |

Although the above tests were carried out on a synthetic mixture of oxygen and nitrogen for the sake of convenience, it is obvious that air could be separated in the same way. The greater part of the argon would then remain in the nitrogen-enriched fraction.

It is generally impossible to obtain the constituents of a gas mixture in a substantially pure state by a single fractionating operation, and it is then desirable to repeat it, combining in series a number of elemental separating devices. The mixture to be separated is introduced into a separating apparatus from the centre zone of a series of devices similar to those of FIGURE 1 and 3. The fraction enriched in the less rapidly adsorbable gas is introduced into the apparatus which succeeds that to which the mixture to be separated is fed, and so on (concentration zone), while the fraction enriched in the more rapidly adsorbable gas is introduced into the preceding apparatus and so on (stripping zone). Generally speaking, the fraction enriched in the less rapidly adsorbable constituent in one stage is introduced into the following stage, while the fraction depleted in this stage is returned to the preceding stage, in accordance with the well known technique of fractional separating operations.

Figure 8:
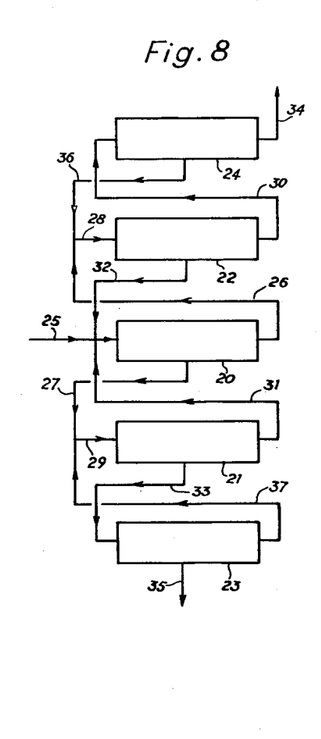
FIGURE 8 illustrates a series grouping of columns of adsorbent for separating fractions more highly concentrated in each of the two constituents to be separated than those obtained by fractionation on a single column.

FIGURE 8 illustrates a group of separating devices such as that of FIGURE 1, the object of which is to produce fractions which are more highly concentrated in each of the constituents of the mixture to be separated. The valves, compressors and vacuum pump have been omitted for the sake of clarity.

The gas mixture is introduced through the duct 25, after the addition of two fractions of like composition, the origin of which will hereinafter be indicated, into the column of adsorbent 20. There is extracted therefrom a fraction enriched in the less quickly adsorbable constituent, which is sent through the ducts 26 and 28 to the column of adsorbent 22 in order to be subsequently enriched, after recompression in a compressor (not shown). On the other hand, there is extracted from the column of adsorbent 20 by a vacuum pump (not shown) a fraction enriched in the more quickly adsorbable constituent, which is delivered through the ducts 27 and 29 into the column of adsorbent 21 in order to be subsequently enriched in

TABLE V

| Opening time of the valve 4 (in sec.) | Volume of the mixture treated, cc. | Gas extracted from the cavity 2 | | | Gas contained in the cavity 3 | | |
|---|---|---|---|---|---|---|---|
| | | Volume | Percent oxygen | Extraction proportion | Volume | Percent oxygen | Extraction proportion |
| 1 | 2,950 | 2,100 | 24.5 | 86 | 850 | 9.8 | 4 |
| 2 | 4,700 | 2,500 | 29.3 | 73.5 | 2,200 | 12 | 25.3 |
| 2.5 | 5,280 | 2,780 | 27.3 | 69.7 | 2,500 | 13.2 | 30.3 |
| 3 | 6,770 | 3,070 | 28 | 61 | 3,700 | 14.4 | 39 |
| 4 | 8,700 | 2,950 | 30 | 48.3 | 5,750 | 16.5 | 51.7 |
| 5 | 11,450 | 3,300 | 29.5 | 39.5 | 8,150 | 18.3 | 60.5 |
| 8 | 15,950 | 4,000 | 27.5 | 32 | 11,950 | 19.7 | 68 |

Figure 7:
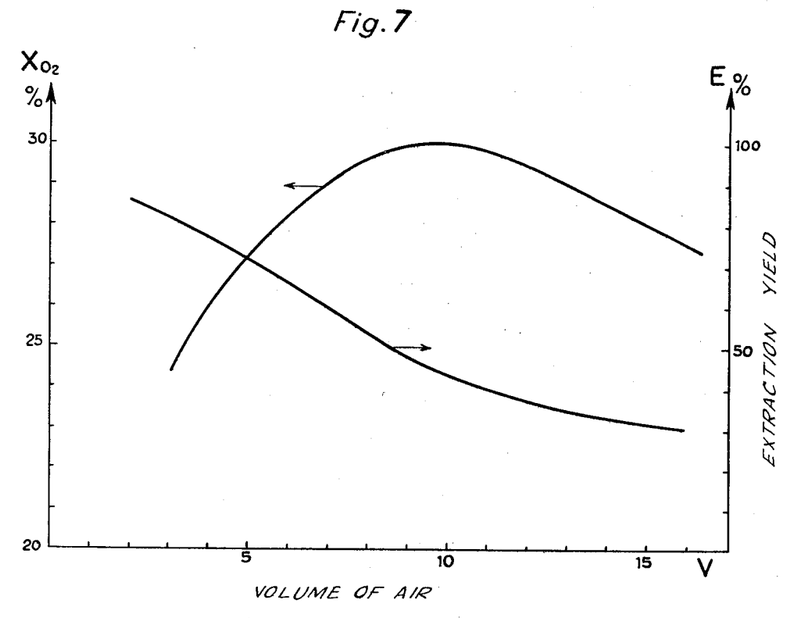
FIGURE 7 illustrates the variation of the oxygen content of the gas extracted from the adsorbent by means of a vacuum, as also the proportion of extraction of the oxygen, in the separation of air by passing it over a column of Molecular Screen 4A, as a function of the volume of air treated.

FIGURE 7 shows that the maximum oxygen concentration of the enriched fraction is in the neighbourhood of 30%, the extraction proportion then being about 50%.

It was also verified that the admission of the mixture could take place at a relatively low pressure, provided that the inlet valve 4 frees a sufficiently large cross-sectional area, the function of the inlet pressure being to prothis latter constituent. The separating column 22 may be succeeded by another column 24, and so on. Likewise, the column 21 may be succeeded by another column 23, and so on. The fraction enriched in the less quickly adsorbable constituent is always sent into the immediately higher adsorbent column, while the fraction enriched in the more quickly adsorbable constituent is sent into the immediately lower column. Thus, there is fed to the column 20, in addition to the gas mixture to be separated, a fraction which has been enriched in the column 21 and returned through the duct 31, and a fraction which has been depleted in the column 22 and returned through a vacuum pump (not shown) and through the conduit 32. Of course, the operating conditions (column length, pressure of introduction, etc.) are so chosen that the various fractions combined at the inlet of a column of adsorbent have substantially the same composition. There is finally extracted at the outlet 34 of the column 24 a fraction which is very rich in the less quickly adsorbable constituent of the mixture, and at the outlet 35 of the column 23, which comprises a vacuum pump, a fraction which is very rich in the more quickly adsorbable constituent. Of course, there may be disposed in the sections (22, 24, etc.), which may be called the concentration zones (21, 23, etc.) and which may be called the stripping zone, a sufficient number of columns of adsorbent for ultimately obtaining the two constituents of the mixture in substantially pure form.

Figure 9:
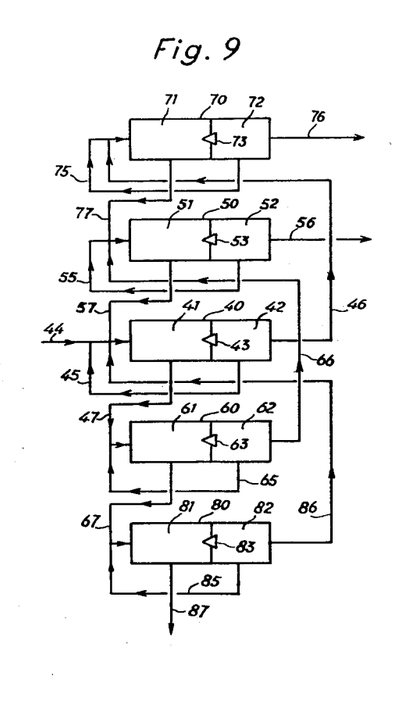
FIGURE 9 illustrates a series grouping of columns of adsorbent each comprising two compartments, such as that illustrated in FIGURE 3, also for the purpose of obtaining a more exhaustive separation than that which can be effected with the aid of a single column.

FIGURE 9 illustrates a group of devices similar to that of FIGURE 3, that is to say, in which the columns of adsorbent are divided into two compartments separated by a non-return valve. In this case, the degree of enrichment of the fraction withdrawn at the end of each column is higher than the degree of depletion of the fraction extracted from the first compartment. The flow of the gases is then as follows. The gas mixture to be separated is introduced through the duct 44, after the addition of three fractions whose origin will hereinafter be indicated, into the column 40, which is divided into two compartments 41 and 42 separated by a non-return valve 43. There is collected at the outlet of the column through the duct 46 a fraction which is highly enriched in the less quickly adsorbable constituent, which is sent, after recompression in a compressor (not shown), not to the enriching column 50 immediately above, but to the following column 70. The fractions adsorbed in each of the compartments 41 and 42 are separately collected by degassing. The fraction emanating from the compartment 42, of which the composition is substantially similar to that of the initial gas mixture to be separated (the operating conditions, notably the respective volumes of the compartments and the volume of the receiving chamber (not shown), and the initial pressure, being chosen with this view), is returned to the inlet of the column of adsorbent through the duct 45. The fraction emanating from the compartment 41, enriched in the more quickly adsorbable constituent, is sent through the duct 47 to the inlet of the column of adsorbent 60 immediately below. This method of flow is also applied to the fractions extracted from the other columns of adsorbent. Therefore, there is sent to the inlet of the column of adsorbent 40 which receives the gas mixture to be separated, on the one hand, through the duct 57, the fraction withdrawn by degassing of the first compartment 51 of the immediately adjacent concentrating column of adsorbent, and on the other hand, through the duct 85, the fraction withdrawn from the outlet of the second stripping column 80. There are finally collected, on the one hand through the ducts 56 and 76 two fractions highly enriched in the less quickly adsorbable constituent, and on the other hand through the duct 87 a fraction highly enriched in the more quickly adsorbable constituent. If the fractions withdrawn through the ducts 56 and 76 both consist of the less quickly adsorbable constituent in substantially pure form, they may be mixed without disadvantage.

Of course, the above-mentioned method of grouping has been referred to only by way of example, and it is equally possible to provide columns of adsorbent divided into three or more compartments, and/or to send the enriched fraction withdrawn from the outlet end, not into the second column of adsorbent by which it is succeeded, but into the third column, and so on, provided that only gas fractions of substantially equal composition are mixed.

It is also possible to combine various processes of separation by adsorption. For example, when air has been separated on the Molecular Screen 4A in accordance with the above-described technique into a nitrogen-enriched fraction, which contains the greater part of the initial argon, and an oxygen-enriched fraction, it is possible to subject the nitrogen-enriched fraction to a separation by the Molecular Screen 5A, by which the oxygen and the argon can be separated from the nitrogen. The mixture of oxygen and argon obtained is then separated by the process of the present patent application, so as to obtain pure argon.

What we claim is:

1. A process for separating a binary gas mixture by means of an adsorbent capable of adsorbing, at a given temperature, the two component gases at high but unequal speeds, and capable of being substantially degassed at the same temperature merely by the action of vacuum, comprising the steps of:

(a) introducing through a first zone in a chamber filled with adsorbent previously degassed in vacuo, and which adsorbent-filled chamber communicates through a second zone thereof with a substantially adsorbent-free hollow closed receiving chamber, at least as soon as the pressure in said second zone exceeds a predetermined value, a give quantity of gas mixture, under a pressure such that its speed of flow through the adsorbent is sufficiently high to prevent adsorption equilibrium from being established between the adsorbed gas and the unadsorbed gas, but relatively low as compared with the speed of adsorption of the more rapidly adsorbed gas, until the pressure has been equalized in said first zone and in said receiving chamber;

(b) interrupting immediately the introduction of the gas mixture, disconnecting the adsorbent-filled chamber from the receiving chamber; and (c) separately withdrawing gas fractions present in the receiving chamber and in the adsorbent-filled chamber by subjecting at least the latter to the action of a vacuum.

2. A process for separating an argon-oxygen gas mixture by means of an adsorbent bed of zeolite 4A., comprising the steps of:

(a) introducing through a first zone in a chamber filled with zeolite 4A. previously degassed in vacuo, and which adsorbent-filled chamber communicates through a second zone thereof with a substantially adsorbent-free hollow closed receiving chamber, at least as soon as the pressure in said second zone exceeds a predetermined value, a given quantity of said argon-oxygen gas mixture, under a pressure such that its speed of flow through the adsorbent bed is sufficiently high to prevent adsorption equilibrium from being established between the adsorbed gas and the unadsorbed gas, but relatively low as compared with the speed of adsorption of the more rapidly adsorbed oxygen component gas, until the pressure has been equalized in said first zone and in said receiving chamber;

(b) interrupting immediately the introduction of said argon-oxygen gas mixture, disconnecting the adsorbent-filled chamber from the receiving chamber; and (c) separately withdrawing gas fractions present in the receiving chamber and in the adsorbent-filled chamber by subjecting at least the latter to the action of a vacuum.

3. A process for separating a binary gas mixture by means of an adsorbent capable of adsorbing, at a given temperature, the two component gases at high but unequal speeds, and capable of being substantially degassed at the same temperature merely by the action of vacuum, comprising the step of:

(a) introducing through a first zone in a chamber filled with adsorbent previously degassed in vacuo, and which adsorbent-filled chamber communicates through a second zone thereof with a substantially adsorbent-free hollow closed receiving chamber, at least as soon as the pressure in said second zone exceeds a predetermined value, a given quatity of gas mixture, under a pressure such that its speed of flow through the adsorbent is sufficiently high to prevent adsorption equilibrium from being established between the adsorbed gas and the unadsorbed gas, but relatively low as compared with the speed of adsorption of the more rapidly adsorbed gas, until the pressure has been equalized in said first zone and in said receiving chamber;

(b) interrupting immediately the introduction of the gas mixture, disconnecting the adsorbent-filled chamber from the receiving chamber; and (c) separately withdrawing gas fractions present in the receiving chamber and in the adsorbent-filled chamber by subjecting at least the latter to the action of a vacuum, wherein the chamber filled with adsorbent is divided into two compartments, comprising respectively the introduction zone and the zone connected to the receiving chamber, which are put in communication when the gas mixture is introduced, then disconnected and separately degassed, the two compartments and the receiving chamber having such relative volumes that the composition of the gas fraction adsorbed in the compartment comprising the zone connected to the receiving chamber is substantially equal to that of the gas mixture to be separated, and the gas fraction withdrawn from this latter compartment is mixed with the gas mixture to be subsequently separated.

References Cited by the Examiner

FOREIGN PATENTS 860,311  2/1961  Great Britain.

REUBEN FRIEDMAN, *Primary Examiner.*